US010789204B2

(12) United States Patent
Bergman et al.

(10) Patent No.: US 10,789,204 B2
(45) Date of Patent: Sep. 29, 2020

(54) ENTERPRISE-LEVEL DATA PROTECTION WITH VARIABLE DATA GRANULARITY AND DATA DISCLOSURE CONTROL WITH HIERARCHICAL SUMMARIZATION, TOPICAL STRUCTURING, AND TRAVERSAL AUDIT

(71) Applicant: International Business Machines Corporation, Armonk, NY (US)

(72) Inventors: Lawrence D. Bergman, Eureka Springs, AR (US); Kumar Bhaskaran, Englewood Cliffs, NJ (US); Winnie W. Cheng, West New York, NJ (US); Robert A. Flavin, Yorktown Heights, NY (US); Milton H. Hernandez, Tenafly, NJ (US); Hai Huang, White Plains, NY (US); Ravi B. Konuru, Tarrytown, NY (US); Yaoping Ruan, White Plains, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 15/965,877

(22) Filed: Apr. 28, 2018

(65) Prior Publication Data
US 2018/0246884 A1 Aug. 30, 2018

Related U.S. Application Data

(62) Division of application No. 13/457,250, filed on Apr. 26, 2012, now Pat. No. 9,959,273.

(51) Int. Cl.
*H04L 9/00* (2006.01)
*G06F 16/00* (2019.01)
(Continued)

(52) U.S. Cl.
CPC ............ *G06F 16/00* (2019.01); *G06F 16/215* (2019.01); *G06F 21/552* (2013.01); *H04L 67/10* (2013.01)

(58) Field of Classification Search
USPC .......................................................... 726/30
See application file for complete search history.

(56) References Cited

U.S. PATENT DOCUMENTS 5,694,594 A 12/1997 Chang
5,857,179 A 1/1999 Vaithyanathan et al.
(Continued)

OTHER PUBLICATIONS

Peter Mell and Tim Grance, "The NIST Definition of Cloud Computing" Version 15, Oct. 7, 2009. National Institute of Standards and Technology, Information Technology Lab, pp. 1-2.
(Continued)

*Primary Examiner* — Christopher J Brown
(74) *Attorney, Agent, or Firm* — Kurt Goudy; Otterstedt, Wallace & Kammer, LLP

(57) ABSTRACT

Access is obtained to a plurality of intermediately transformed electronic documents (with a plurality of sections and subsections) which have been transformed, by topical analysis and text summarization techniques, from a plurality of original electronic documents comprising at least some unstructured electronic documents. Audit and retrieval agent code is appended to the sections and subsections to create a plurality of finally transformed electronic documents. Users are allowed to access the finally transformed electronic documents. The users are provided with accountability reminders contemporaneous with the access. The access of the users to the sections and subsections of the finally transformed electronic documents is logged. An audit report is provided based on the logging. Also provided is a cloud service for enterprise-level sensitive data protection with
(Continued)

variable data granularity, using one or more one guest virtual machine images.

11 Claims, 9 Drawing Sheets

(51) Int. Cl.
*G06F 16/215* (2019.01)
*H04L 29/08* (2006.01)
*G06F 21/55* (2013.01)

(56) References Cited

U.S. PATENT DOCUMENTS

| | | | |
|---|---|---|---|
| 6,654,739 | B1 | 11/2003 | Apte et al. |
| 6,678,692 | B1 | 1/2004 | Hyatt |
| 6,738,767 | B1 | 5/2004 | Chung et al. |
| 7,334,187 | B1 | 2/2008 | Stanciu et al. |
| 7,512,605 | B2 | 3/2009 | Spangler |
| 7,958,147 | B1 | 6/2011 | Turner et al. |
| 8,001,609 | B1 | 8/2011 | Chan et al. |
| 8,132,261 | B1 * | 3/2012 | Simpson ............ G06F 21/6218 726/2 |
| 2005/0153686 | A1 | 7/2005 | Kall et al. |
| 2008/0086727 | A1 * | 4/2008 | Lam ..................... G06F 8/63 718/1 |
| 2008/0104118 | A1 | 5/2008 | Pulfer et al. |
| 2010/0010968 | A1 * | 1/2010 | Redlich ............... G06Q 10/00 707/E17.014 |
| 2010/0228693 | A1 | 9/2010 | Dawson et al. |
| 2011/0078159 | A1 | 3/2011 | Li et al. |
| 2012/0324182 | A1 * | 12/2012 | Yamamoto ........... G06F 3/0608 711/161 |
| 2013/0054613 | A1 | 2/2013 | Bishop |
| 2013/0222836 | A1 | 8/2013 | Kakegawa |
| 2013/0291127 | A1 | 10/2013 | Bergman et al. |

OTHER PUBLICATIONS

Michael Steinbach, et al. "A Comparison of Document Clustering Techniques". downloaded from www.cs.fit.edu/~pkc/classes/ml-internet/papers/steinbach00tr.pdf on Apr. 27, 2012, pp. 1-2.

Adam Hess, et al. "Content-Triggered Trust Negotiation".ACM Transactions on Information and System Security, vol. 7, No. 3, Aug. 2004, pp. 428-456.

"DB2 Label-Based Access Control, a practical guide, Part 1: Understand . . . DB2",downloaded from https://www.ibm.com/developerworks/data/tutorials/dm0605wong/ on Oct. 8, 2011, pp. 1-2.

Sabah Al-Fedaghi, "How Sensitive is Your Personal Information?" SAC'07, Mar. 11-15, 2007, Seoul, Korea, pp. 165-169.

"Optim Integrated Data Management", downloaded from http://www-01.ibm.com/software/data/data-management/optim-solutions on Oct. 8, 2011, p. 1.

Peter Willett, "Recent Trends in Hierarchic Document Clustering: A Critical Review". Information Processing & Management vol. 24, No. 5, pp. 577-597, 1988.

Rakesh Agrawal, et al. white paper, "Managing Disclosure of Private Health.. Hippocratic databases",Jan. 2005, www.almaden.ibm.com/cs/.../nc_hdb_white_paper health.pdf, Jan. 2005 pp. 1-27 plus cover.

* cited by examiner

FIG. 7

Change Number: 1760076 — Record Status: Open
Category: IBW_WSS_UPDATE — Approval Status: Pending

Change Information

| Change Information | Change Date Information | Change Completion Information |
|---|---|---|
| Change Number: 1760076 | Created Date/Time: Jul 20, 2009 5:20:53 PM | Completion Code: |
| Change Abstract: AP - ESX 3.0.x - APPLY LAST PATCH TO ESX SERVER APGDCVH1 | Required Date/Time: Nov 22, 2009 7:00:00 AM | Closed Date/Time: |
| Priority: | Scheduled Date/Time: Nov 21, 2009 9:00:00 AM | Actual Duration: |
| Change Risk: Major | Actual Implementation Date/Time: | Estimated Duration: 0000:22:00 |

Requester Details / Assignee Details

| | | ID: BRE85662 |
|---|---|---|
| System Reference: | Last Name: BENOTI | |
| | First Name: TIAGO | |
| | Middle Name: | |
| Component Name: | Employee ID: E85662 | Last Name: BENOTI |
| | | First Name: TIAGO |
| | | Middle Name: |
| Component Location: | Phone: 21326218 | Employee ID: E85662 |
| Delivery Organization: | Group: | Phone: 21326218 |
| Organization Name: IBW | | Group: IBW-1-XXSSOWIND |
| Operator Intervention: No | | Area:        Lock Status |

Author Details

| | ID: BRE85662 | |
|---|---|---|
| Pre/Co Requisite Changes: | Last Name: BENOTI | Last Name: |
| Expedite Reason: | First Name: TIAGO | First Name: |
| | Middle Name: | Middle Name: |
| Parent Change Number: | Employee ID: E85662 | Employee ID: |
| Department: F110 | Phone: 21326218 | Phone: |
| Division: VU | Group: IBW-1-XXSSOWIND | |

Description:
Upgrade ESX server APGDCVH1 from version 3.0.1 build 42829 to version 3.0.3 and all pending patches.

Change Number: 1760076 — Record Status: Open
Category: IBW_WSS_UPDATE — Approval Status: Pending

Costs

| | Currency: USD |
|---|---|
| Cost Center: IBW | |
| Estimated Fixed Costs: 0.00 | Actual Fixed Costs: 0.00 |
| Estimated Labor Costs: 0.00 | Actual Labor Costs: 0.00 |

Change Number: 1760076 — Record Status: Open
Category: IBW_WSS_UPDATE — Approval Status: Pending

Instructions

Installation Instructions/Backout Plan/Backout Duration
Installation Instructions: Upgrade ESX server APGDCVH1 from version 3.0.1 build 42829 to version 3.0.3 and all pending patches.
Backout plan: Uninstall the update.
Backout Duration: 8 hours Test Plan
Open virtual Center Console and expand all views to confirm all hosts are listed and communicating.

Customer Impact (if applicable Customer Communications)
As the upgrade will be done on the physical server, all VMs hosted on it will be unavailable during the maintenance window MCIP details for each VM hosted

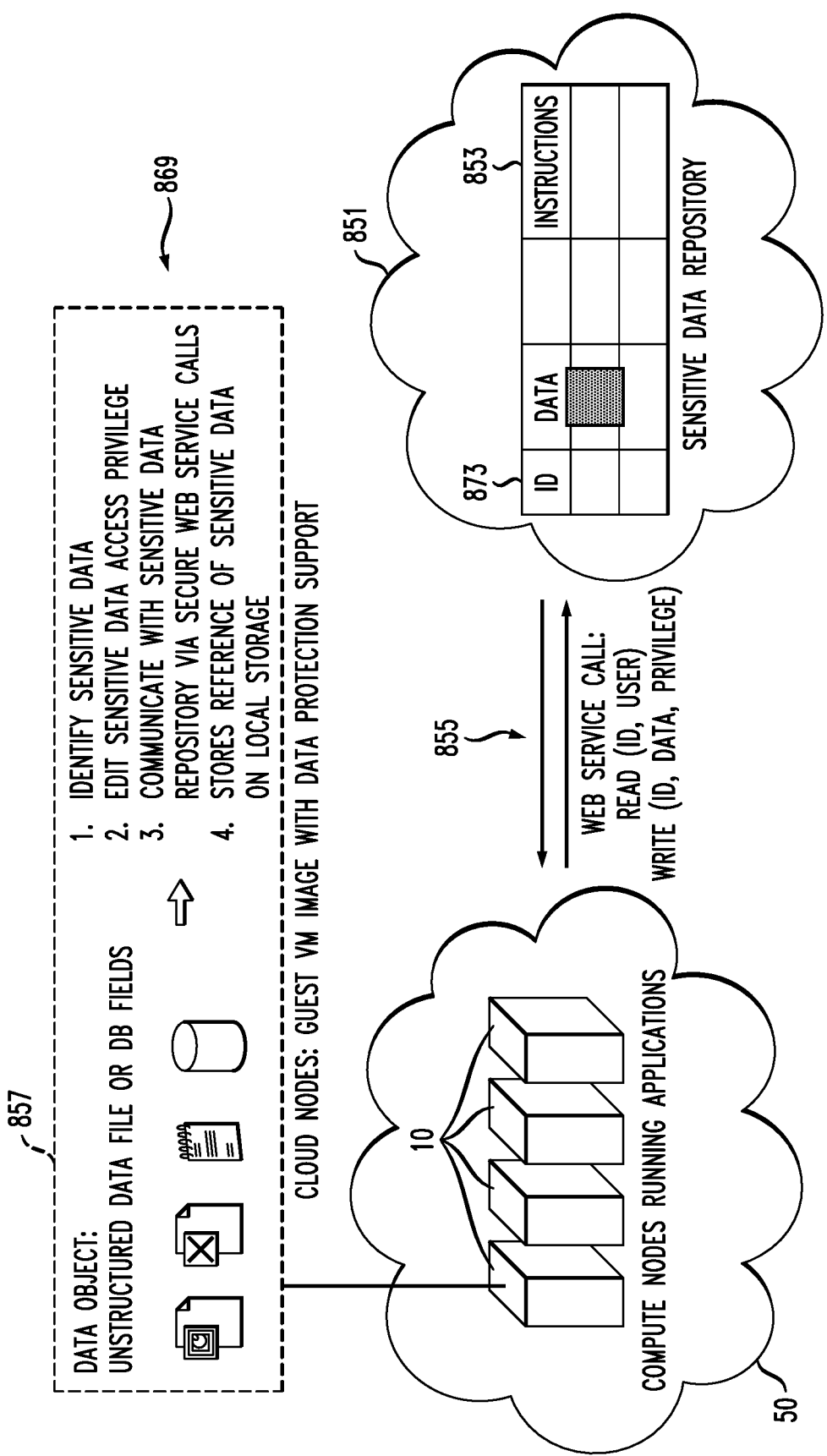

ENTERPRISE-LEVEL DATA PROTECTION WITH VARIABLE DATA GRANULARITY AND DATA DISCLOSURE CONTROL WITH HIERARCHICAL SUMMARIZATION, TOPICAL STRUCTURING, AND TRAVERSAL AUDIT

CROSS-REFERENCE TO RELATED APPLICATIONS

This application is a division of U.S. patent application Ser. No. 13/457,250 filed 26 Apr. 2012, and entitled ENTERPRISE-LEVEL DATA PROTECTION WITH VARIABLE DATA GRANULARITY AND DATA DISCLOSURE CONTROL WITH HIERARCHICAL SUMMARIZATION, TOPICAL STRUCTURING, AND TRAVERSAL AUDIT. The complete disclosure of U.S. patent application Ser. No. 13/457,250 is expressly incorporated herein by reference in its entirety for all purposes.

STATEMENT OF GOVERNMENT RIGHTS

Not Applicable.

FIELD OF THE INVENTION

The present invention relates to the electrical, electronic and computer arts, and, more particularly, to security techniques and the like.

BACKGROUND OF THE INVENTION

Data protection is currently enforced by access control at the file level (for unstructured data files), or at the data table level (for a structured data base). Unless part of the contract, sensitive data usually is mixed with other data without any special protection.

Compliance auditing tools allow companies to verify compliance with, for example, data disclosure laws, company polices, and/or customer preferences. Such tools may track, for example, the user, recipient, purpose, and time of candidate queries, and the information disclosed by each query.

SUMMARY OF THE INVENTION

Principles of the invention provide techniques for enterprise-level data protection with variable data granularity and/or data disclosure control with hierarchical summarization, topical structuring, and traversal audit. In one aspect, an exemplary method includes the step of obtaining access to a plurality of intermediately transformed electronic documents which have been transformed, by topical analysis and text summarization techniques, from a plurality of original electronic documents comprising at least some unstructured electronic documents. The plurality of intermediately transformed electronic documents have a plurality of sections and subsections. Further steps include appending to the sections and subsections audit and retrieval agent code to create a plurality of finally transformed electronic documents; allowing users to access the finally transformed electronic documents; providing the users with accountability reminders contemporaneous with the access; logging the access of the users to the sections and subsections of the finally transformed electronic documents; and providing an audit report based on the logging of the access of the users.

In another aspect, another exemplary method includes the step of, in a cloud computing system including a plurality of interconnected compute nodes running a plurality of applications operating on a plurality of data objects stored in a normal storage area, instantiating at least one guest virtual machine image. Further steps include removing, with the at least one guest virtual machine image, select regions of the data objects, the select regions requiring special handling; storing, in connection with the plurality of data objects in the normal storage area, an index of a corresponding one of the removed select regions; writing the removed select regions of the data objects into a separate customized data repository together with corresponding attributes specifying the special handling; and for a given one of the data objects having at least one of the select regions requiring the special handling, providing the special handling when consuming the given one of the data objects in accordance with an appropriate one of the corresponding attributes.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments can be applied to legacy applications which did not have the fine granularity access control mechanism designed and implemented. One or more embodiments provide service APIs to the legacy application. Rather than redesign and re-implement the entire system, the resulting system will achieve the right compliance control by redirecting request(s) of sensitive data to a repository and/or allow same to be revealed in audit logs.

These and other features and advantages of the present invention will become apparent from the following detailed description of illustrative embodiments thereof, which is to be read in connection with the accompanying drawings.

BRIEF DESCRIPTION OF THE DRAWINGS

FIG. 7 shows an incident ticket in accordance with an aspect of the invention;

FIG. 8 shows an exemplary cloud service for enterprise-scale sensitive data management in accordance with an aspect of the invention.

DETAILED DESCRIPTION OF PREFERRED EMBODIMENTS

Figure 1:
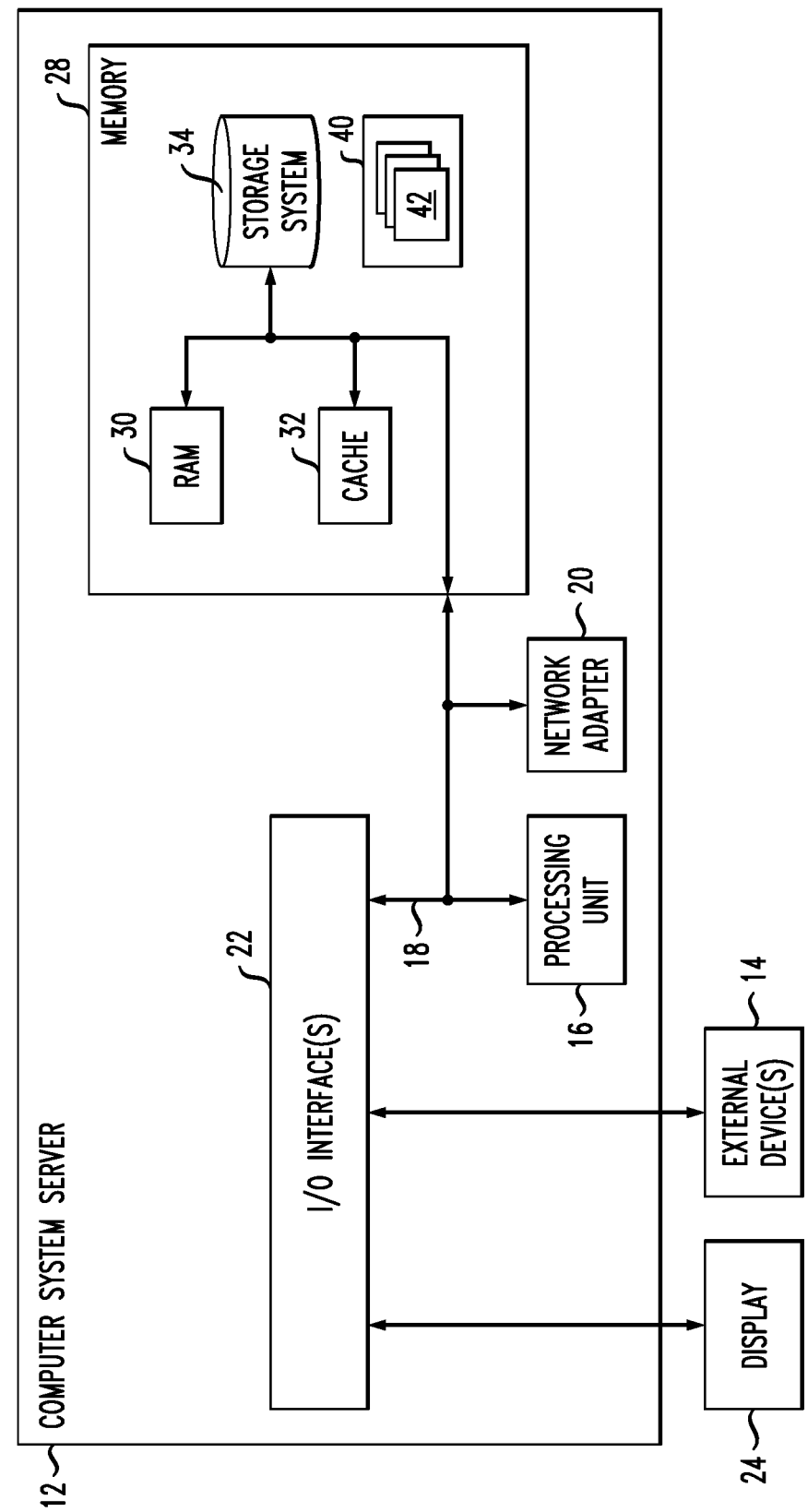
FIG. 1 depicts a cloud computing node according to an embodiment of the present invention.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
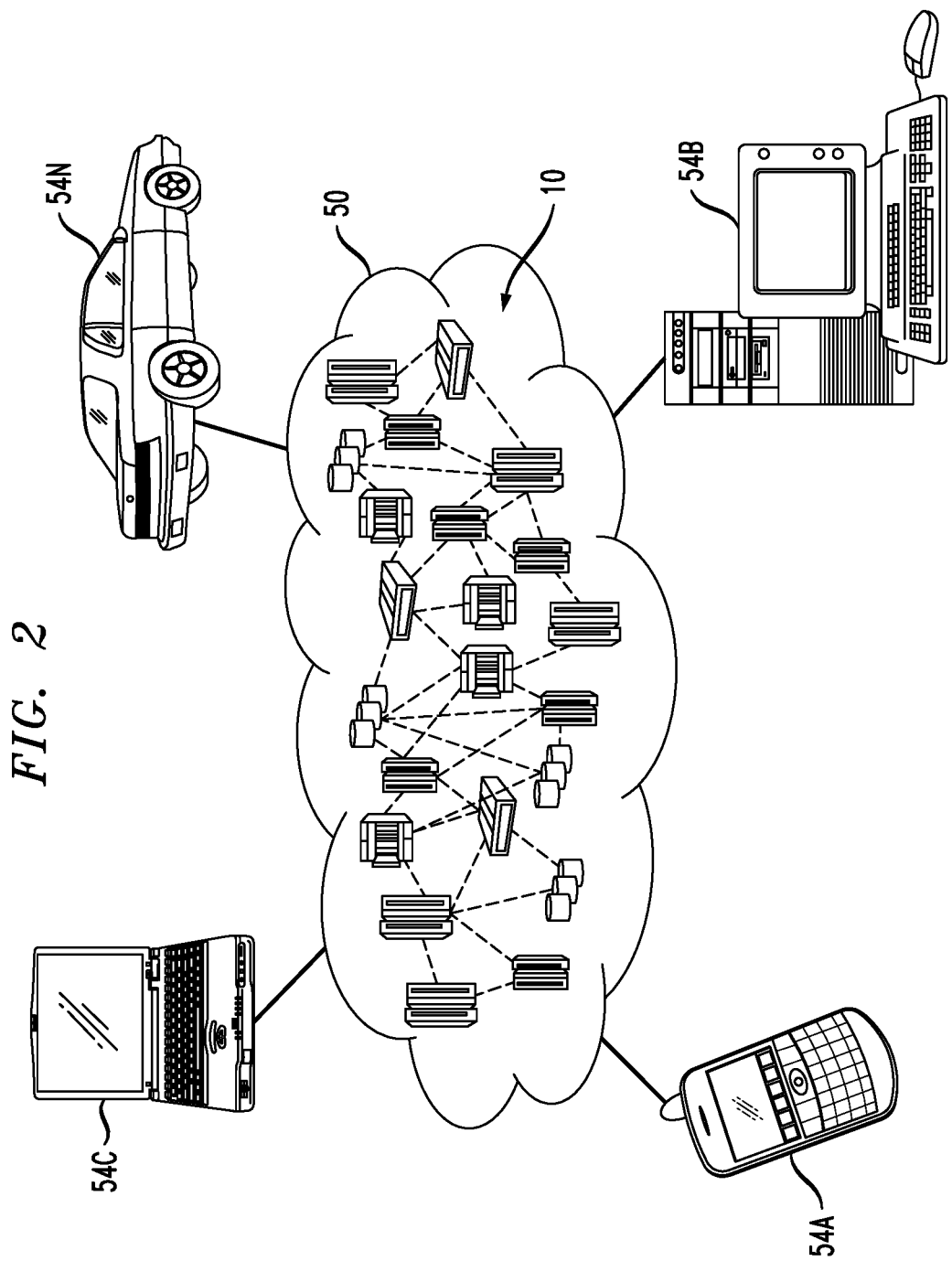
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
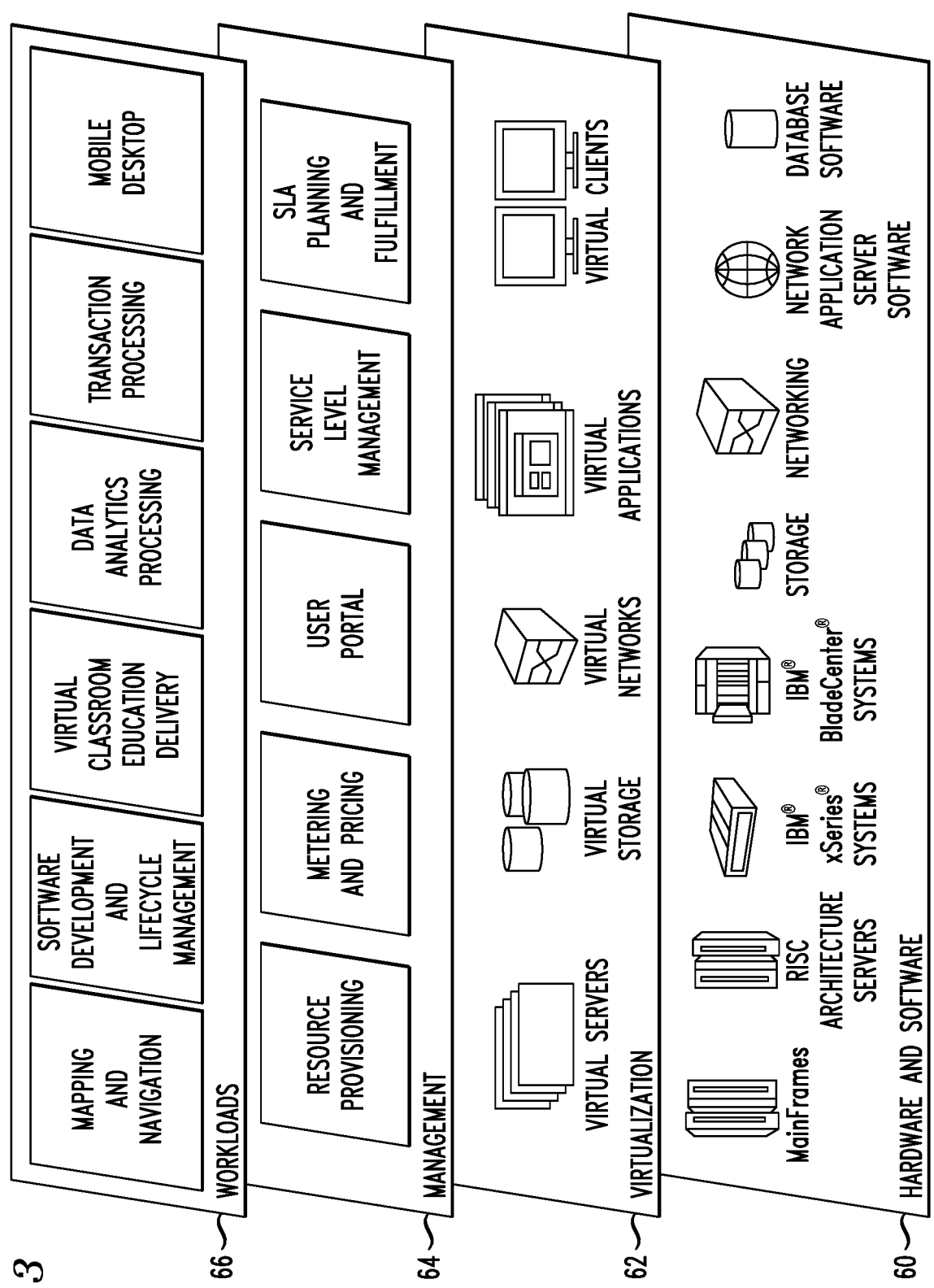
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Effective Data Disclosure Control with Hierarchical Summarization, Topical Structuring, and Traversal Audit One or more embodiments advantageously address corporate compliance and global service delivery, providing novel and effective solutions to data disclosure control and auditing in service delivery environments wherein a contractor provides services for an entity.

A non-limiting example of an exemplary application is a web portal that discloses problem and/or incident tickets for the management of an online service. These tickets are unstructured data containing problem descriptions, diagnostics logs and application outputs, and other free-form text input. They are made available and are routed through large groups of system administrators responsible for maintaining the service. These tickets may contain data with different levels of sensitivity. For example, problem error codes are less sensitive than social security numbers and application data such as health records that may be included in diagnostics logs. Failure to protect the disclosure of certain sensitive data can violate regulations leading to costly lawsuits and irreversible damage to a corporation's reputation. Protecting such unstructured data that must be made available to a large population remains a challenge and demands nontrivial solutions.

One or more embodiments advantageously provide enhanced data disclosure control. Data disclosure control limits the exposure of sensitive data to different users. This is a common problem, with many solutions, depending on the context and assumptions that such techniques operate under.

One or more embodiments address the following context and assumptions:
Unstructured data with varied sensitivity in different sections of the document; and/or
Large group of users require general access to the document but does not need to know content of entire document.

Within this scope, one or more embodiments provide useful results that cannot be achieved with existing solutions.

Furthermore in this regard, existing solutions can be divided into two main categories: (1) Access Control, and (2) Redaction Techniques. Access control provides the ability for a data controller to specify the types of data that can be read by users and/or group of users. A document can be disclosed to a user by granting read access on the document. Access control is insufficient as it typically works at a coarse-grain, per-document level; that is, access to a user is granted either for the entire document or not at all.

Figure 4:
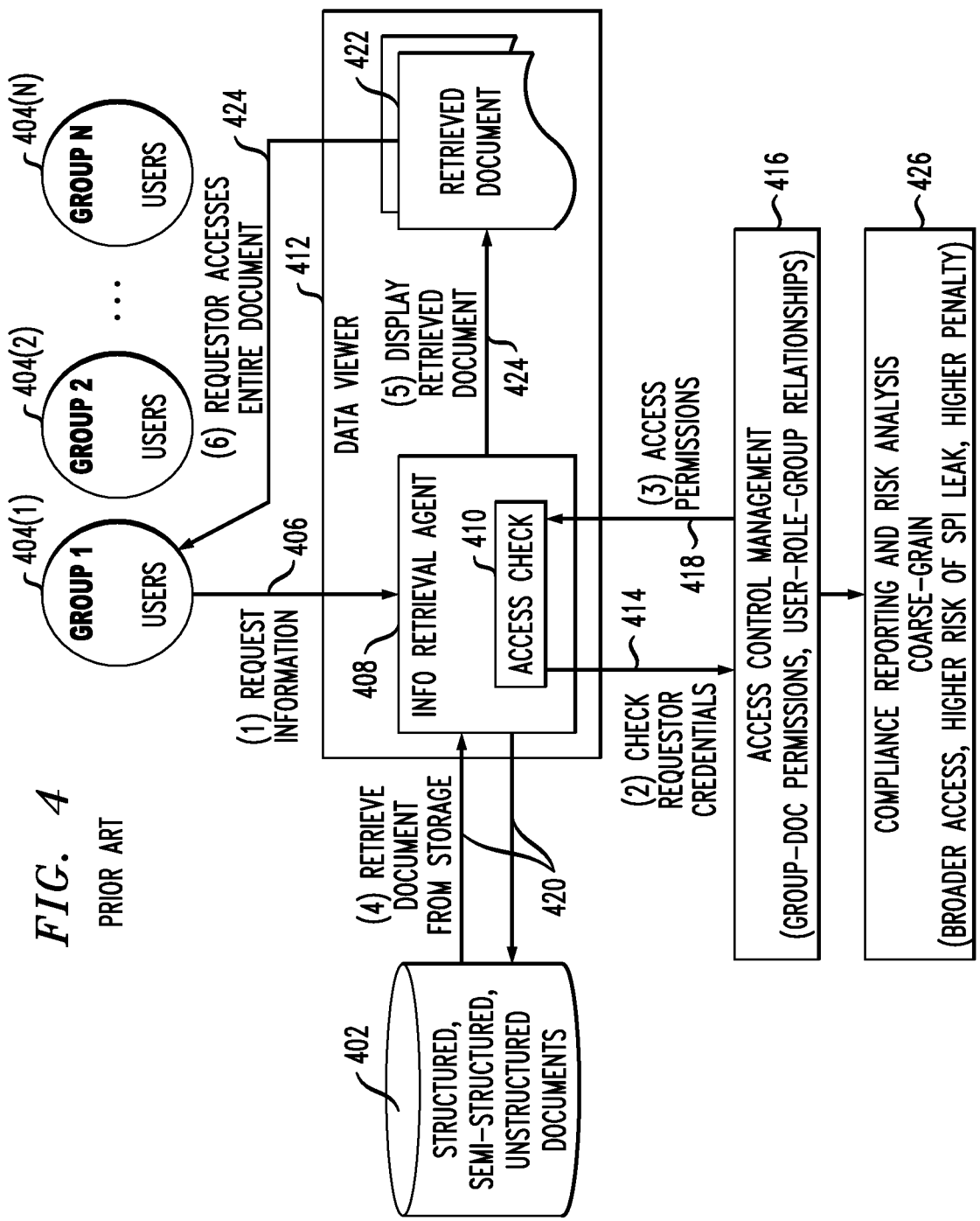
FIG. 4 shows an audit process in accordance with the prior art.

As seen in FIG. 4, data store 402 includes structures, semi-structured, and unstructured documents. A plurality of users are divided into N groups 404(1)-404(N). A user in Group 1 requests information at 406. The request is made to an information retrieval agent 408 including an access check component 410. The agent is part of a data viewer 412. The access check component 410, at 414, checks to see if the Group 1 user is allowed to have the requested information. This check is made with access control management unit 416, which unit responds to the check at 418. Assuming that access is permitted, agent 408, at 420, retrieves the requested document from data store 402. The retrieved document or documents 422 are then displayed to the user, as shown at 424. As seen at 426, the current technique is capable of compliance reporting and risk analysis of a coarse-grained nature. The coarse-grained aspect of current techniques is believed to result in broader access with concomitant higher risk of leakage of sensitive personal information (SPI) and thus there is a higher likelihood of penalties being imposed.

It is worth noting that one or more embodiments are generally applicable to the protection of sensitive information; in some cases, this may be sensitive personal information (such as under the Health Insurance Portability and Accountability Act of 1996 (HIPAA) information) but the invention is not so limited.

There has been existing work that proposes finer-granularity control on structured data, such as at the level of database tuples (for example, Label-Based Access Control (LBAC) in IBM's DB2® database software). However, it is believed that heretofore, there has not been work that addresses fine-grained access control on unstructured data such as free-form text documents. Redaction techniques can limit disclosure of sensitive data by searching for specific patterns in unstructured data and filtering or blanking them out (e.g., IBM OPTIM Integrated Data Management—mark of International Business Machines Corporation, Armonk, N.Y., USA—which provides an integrated, modular environment to design, develop, deploy, operate, optimize and govern enterprise data throughout its lifecycle). However, in environments where the document must be made generally accessible to a large group of users, customization of filtering constraints for each user is believed to be impractical.

One or more embodiments advantageously use text mining techniques and access monitoring of hierarchical sections and topical segments of unstructured data to provide data disclosure control.

In one or more embodiments, a document is processed using text mining and summarization techniques to decompose the document into sections represented by key features, phrases and keywords. These sections are arranged in a hierarchical manner that gradually dives deeper into the content, revealing more detailed information with potentially higher sensitivity. A user is initially displayed a very abstract and highly summarized outline of the document. Then, traversal and access patterns through this hierarchy are monitored at each step, with sufficient authentication and auditing to assess the sensitivity of data that was exposed to each user. Users are warned, as they attempt to access more detailed information, that they should be accessing such information only if it is necessary to do so. In this way, data disclosure control is enforced by reducing exposure of detailed information to users and holding users accountable for accessing data that they do not have the 'need-to-know.'

This solution is particularly effective in the common situation where the sensitivity of unstructured data may vary within a document and cannot be concretely defined a priori. One or more embodiments provide a framework that controls data disclosure via accountability and deterrence, and supports reliable post-data breach incident analysis capabilities.

A non-limiting exemplary embodiment of an audit process and/or system, according to an aspect of the invention, includes five main components:

I. Document Decomposition:

Documents that require data disclosure control are first processed by text mining algorithms. Clustering and summarization techniques iteratively break down the documents into hierarchical sections. Each section is represented by short phrases, keywords or distinguishing features that summarize it. The section content is displayed in full at the deepest level of the hierarchy.

For example:

| "Problem Description" | -> Status | -> Open/Close Timestamp |
| --- | --- | --- |
|  |  | -> Resolved By |
|  | -> Failure Points |  |
|  | -> OS log | -> OS process dump |
| -> System Configurations |  |  |
| -> Memory Image |  |  |
|  | -> Email from Joe Smith | -> Email Content |

II. User Login and Accountability Reminder:

When a user wants to access a document in the system, he or she logs in with proper credentials. The system authenticates and identifies the user. Upon successful log-in, a reminder is displayed to the user that his or her accesses are monitored and logged, and that accesses should only be made on a 'need-to-know' basis.

III. Hierarchical and Topical Retrieval:

The user is then displayed the top level of the document decomposition (e.g., outline of major sections of document). The user can expand a section, to traverse deeper into the section, displaying the summary of the next level.

IV. Traversal and Access Pattern Auditing:

The users' traversal patterns through the hierarchy are logged along with the time of access and user information. This auditing information is stored secured and persistently.

V. User Access Report Generation:

This component generates reports on different users' access patterns and provides a querying interface into the auditing information for post-data breach analysis. Of course, this feature is intended for users who have consented to such monitoring, for use in activities such as forensic analysis (post-breach incident investigation).

Thus, one or more embodiments provide a method and apparatus for effective data disclosure auditing with hierarchical summarization, topical structuring, and traversal audit. One non-limiting exemplary use case includes information technology (IT) services delivery for a healthcare institution. A non-limiting exemplary usage framework considers users' records where each record may have a set of privacy information. For audit purposes, the record repository owner needs to provide an audit process indicating which information was accessed, and by whom.

In one non-limiting exemplary scenario, incident tickets may contain ePHI (electronic Personal Health Info). A contractor providing IT services to the healthcare institution might be responsible, for example, for auditing access, as well as assessing and reducing the risk of ePHI exposure. Government reporting is typically required; for example, in the US, under Health Insurance Portability and Accountability Act (HIPAA) regulations.

To manage the IT infrastructure and/or improve operations, many employees of the IT contractor may need to access incident tickets, for a variety of purposes. For example, dispatchers extract the ticket defect category to assign tickets to system administrators; system administrators examine ticket details to resolve problems; and quality analysts use ticket counts to proactively reduce problems for a server group.

Many employees of the IT contractor may thus need access to tickets, but for different portions of a ticket. Different portions may have different compliance risks. For example, the ticket description field is more likely to have ePHI than the ticket title; a ticket attachment such as an application log is more likely to have ePHI than the description.

The current audit process, depicted in FIG. 4, has been discussed above.

In one or more embodiments, compliance risks are reduced by obtaining knowledge regarding who accessed which portions of the document and/or making users aware of the risks when they access different portions. One or more embodiments provide a data disclosure auditing system that lowers disclosure risk by hierarchical breakdown of documents and provides detailed logging of access at different levels; allows forensic analysis that can pinpoint disclosure to a reduced population on specific portions of the document; and/or provides a lightweight mechanism with low implementation costs.

One or more embodiments allow productivity in operational efficiency while reducing compliance and data exposure risks. For example, suppose the penalty per cost of data exposure is $X. If all that is known is the number of employees of the contractor who accessed a given set of tickets (say 10,000), the penalty would then be $10,000·X. However, if, through finer granularity of one or more embodiments of the invention, it can be determined that only ten employees of the contractor accessed the application log that was found to have ePHI, the contractor is only responsible for $10·X.

Figure 5:
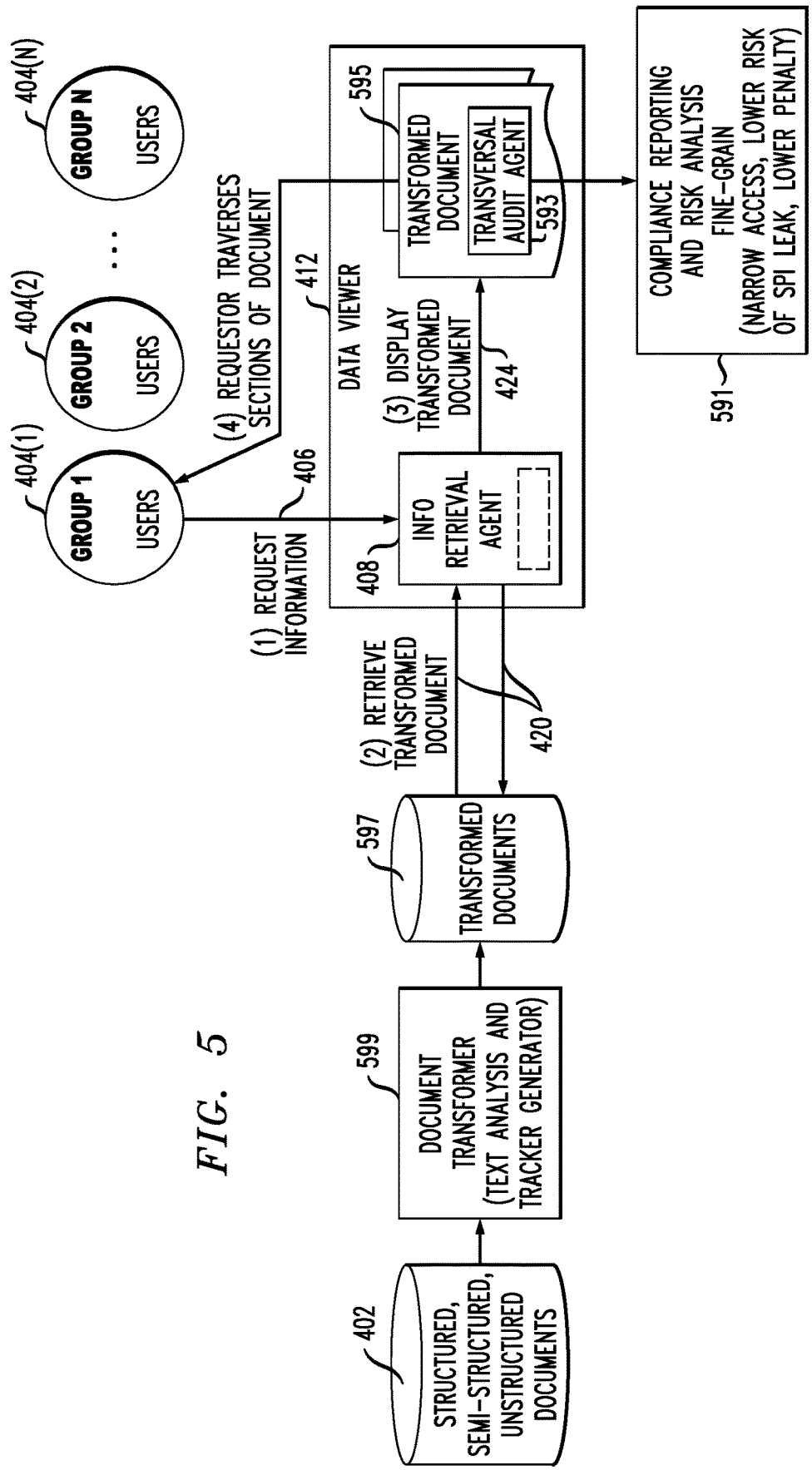
FIG. 5 shows an audit process in accordance with an aspect of the invention.

Attention should now be given to the exemplary embodiment FIG. 5. Elements similar to those in FIG. 4 have received the same reference character. Data store 402 includes structures, semi-structured, and unstructured documents. A plurality of users are divided into N groups 404(1)-404(N). A user in Group 1 requests information at 406. The request is made to an information retrieval agent 408. The agent is part of a data viewer 412. It should be noted that aspects of the embodiment of FIG. 5 are particularly useful in cases where access control and access checking are not feasible; however, optionally, the embodiment of FIG. 5 can also include the access check block 410 and access control management block 416.

Figure 6:
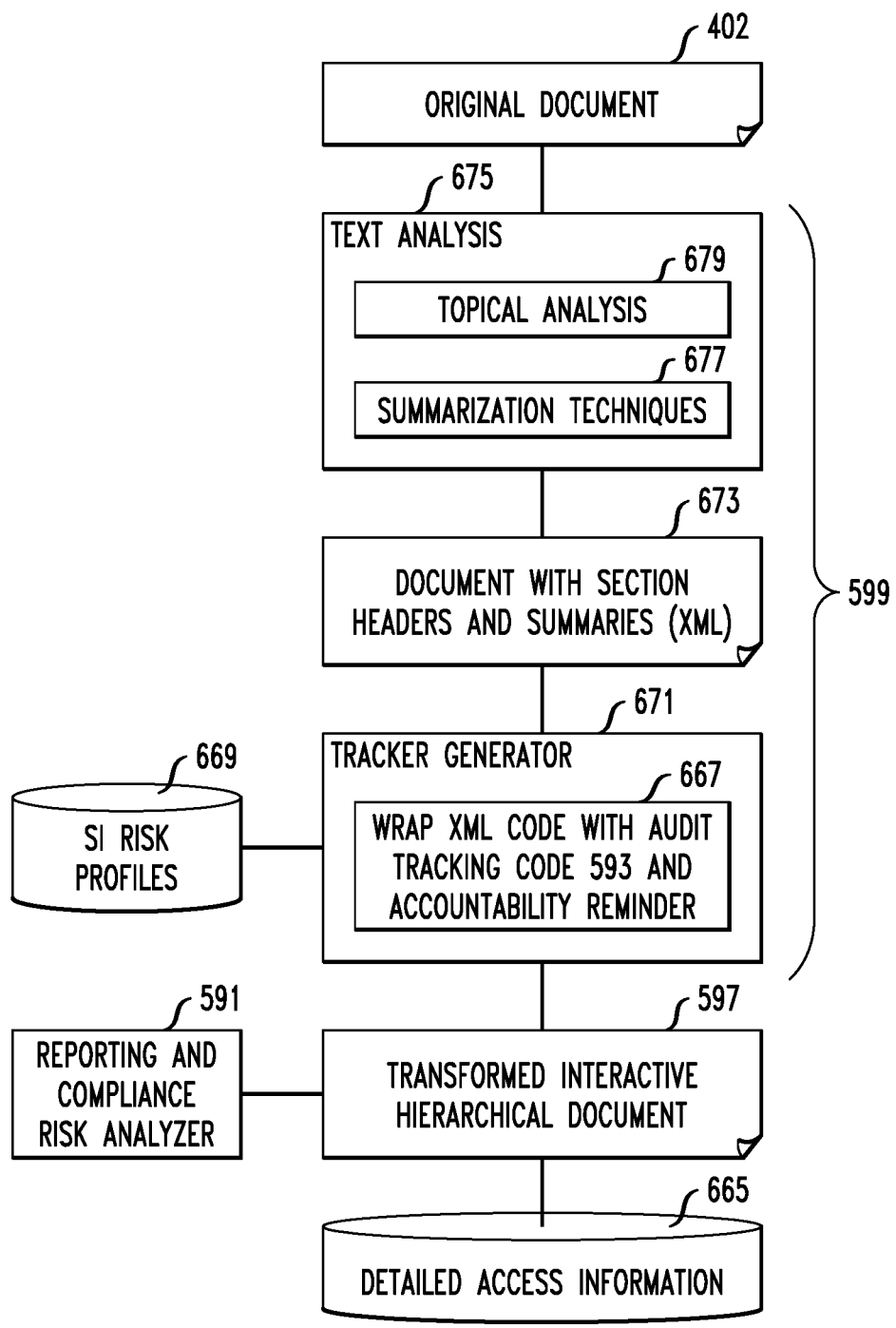
FIG. 6 shows an audit system in accordance with an aspect of the invention.

Document transformer 599, discussed in greater detail with respect to FIG. 6, transforms the documents in data store 402 into transformed documents 597. Agent 408, at 420, retrieved transformed document or documents 595 are then displayed to the user, as shown at 424. Traversal audit agent 593, as seen at 591, is capable of compliance reporting and risk analysis of a fine-grained nature. The fine-grained aspect of one or more embodiments of the invention is believed to result in narrower access with concomitant lower risk of leakage of sensitive personal information (SPI) and thus there is a lower likelihood of penalties being imposed.

Referring also now to FIG. 6, one or more embodiments employ topical analysis 679 and text summarization techniques 677 to decompose documents into sections and subsections and to generate summaries for different sections and/or subsections. Block 675 represents the text analysis aspect of document transformer 599. Block 675 appends an audit and/or retrieval agent code to these different sections, creating an interactive hierarchical document 673 with detailed section accesses logged to an audit database. This document may, for example, be in extensible markup language (XML). The tracker generator 671 (tracker generator aspect of document transformer 599) takes input from SPI risk profile store 669 and wraps XML documents 673 with an audit tracking code and an accountability reminder, as seen at 667. The result is the transformed interactive hierarchical document 597. Users are presented and access this transformed document with hierarchical retrieval and auditing capabilities from analyzer 591 as well as the aforementioned accountability reminders. Reporting and compliance risk analysis is performed on the detailed access log 665 which can be used to update risk profiles and accountability reminders in the transformed document 597.

Note that traversal audit agent 593 is a simple component that logs who has had access to what portions of the data.

One or more embodiments thus provide a method and/or process to facilitate audit checks in cases where authorization of document access yields only a coarse-grained audit log, wherein documents are decomposed into sections and subsections using topical analysis and text summarization, a specialize agent code is appended to each of the sections and subsections, access to each section of the data generates an interactive hierarchical access log, the access log is analyzed for reporting and assessing compliance risks, the analysis can generate risk profiles for different sections of the document, and accountability reminders are shown to the user.

FIG. 7 shows an exemplary incident ticket. The skilled artisan will appreciate that dispatchers typically need to know ticket status and category; system administrators typically need to know ticket description and instructions, and service level owners typically need to know costs.

Transformed Document 597 will typically be audited at each level. For example:
1. GENERAL (Info on "Change," "Time," "Status," . . . )
    1.1. Time (Info on "Created Time," "Closed Time," . . . )
        1.1.1 Created Time (Info on <value>)
        1.1.2 Closed Time (Info on <value>)
2. COST (Info on "Cost Center," "Estimated," . . . )
    2.1. Cost Center (Info on <value>)
    2.2. Estimated Labor Cost (Info on <value>)
3. INSTRUCTIONS (Info on "Upgrade will be on physical server . . . ")
    3.1. Abstract (Info on "As the upgrade will be done . . . ")
    3.2. Server Login (Info on "Server Name", "Username," . . . )
    3.3. Server Log (Info on "Query on Account ID 234 returned null . . . ")

With regard to Audit Report and Compliance Risk Analyzer 591, different sections and/or subsections may have different SI risk profiles 669; this allows for alerting the user when trying to access the "risky" sections, such as, for example, the server log section of tickets. Furthermore, this also provides more precise information on who actually accessed the content of critical sections in the case of a breach, so as to minimize the compliance penalty.

Detailed access reports 665 provide an audit trail on user retrieval patterns. This lowers access by those without the need-to-know, as users know their access behavior is monitored. Furthermore, having an audit in place at this level makes users feel more accountable for their actions.

One or more embodiments of the invention directed to effective data disclosure auditing with hierarchical summarization, topical structuring, and traversal audit thus do not attempt to a priori decide whether a section of a document is sensitive or not; rather, one or more such embodiments break down the document, and risk profiles can be assigned after data access and can be continually updated with the compliance risk analyzer. One or more embodiments of the invention directed to effective data disclosure auditing with hierarchical summarization, topical structuring, and traversal audit thus are directed to an auditing system and not necessarily a heavyweight access control system that forbids access to predefined sensitive areas of a document.

One or more embodiments of the invention directed to effective data disclosure auditing with hierarchical summarization, topical structuring, and traversal audit thus focus not so much on authorization-based access control, but rather are directed to a sophisticated auditing and disclosure risk assessment framework. In terms of system architecture, one or more embodiments of the invention directed to effective data disclosure auditing with hierarchical summarization, topical structuring, and traversal audit break down a document into different portions (not just two categories of sensitive/not-sensitive). The sensitivity and disclosure risks of different portions are continually analyzed and updated as feedback in one or more embodiments; that is to say, one or more embodiments are not implementing policies but rather risk profiles.

A variety of techniques can be used to carry out document decomposition. One example is set forth in PETER WILLETT, "RECENT TRENDS IN HIERARCHIC DOCUMENT CLUSTERING: A CRITICAL REVIEW," Information Processing & Management Vol. 24, No. 5, pp. 517-597, Pergamon Press 1988, expressly incorporated herein by reference in its entirety for all purposes (although the skilled artisan will be familiar with same per se). It introduces algorithms used to the calculation of inter-document similarities and to clustering methods that are appropriate for document clustering. Steinbach et al. compare different document clustering techniques in "A Comparison of Document Clustering Techniques," Department of Computer Science/Army HPC Research Center, University of Minnesota, expressly incorporated herein by reference in its entirety for all purposes (although the skilled artisan will be familiar with same per se), in which common clustering techniques such as agglomerative hierarchical clustering and K-means are studied.

In one non-limiting example, co-assigned U.S. Pat. No. 6,654,739 of Apte et al., expressly incorporated herein by reference in its entirety for all purposes (although the skilled artisan will be familiar with same per se), specializes in high dimensions, and large quantities of documentation using similarity scores. Spangler in co-assigned U.S. Pat. No. 7,512,605, expressly incorporated herein by reference in its entirety for all purposes (although the skilled artisan will be familiar with same per se), teaches a document clustering technique based on cohesive terms.

One or more embodiments of the present invention leverage techniques for topic and keyword extraction to provide a security system that uses such techniques; e.g., an auditing system and risk assessment framework built on top of the topic and keyword extraction. One or more embodiments of the present invention provide an auditing and monitoring system that can utilize a document broken down hierarchically. One or more embodiments of the present invention make use of hierarchically decomposed documents for the construction of a detailed auditing system and not for network data retrieval management or assessing similarity between a set of documents. The hierarchy can be generated using a variety of techniques. One or more embodiments of the present invention can use a variety of hierarchical decomposition processes, such as with the techniques suggested by Willett, Steinbach, Apte, Spangler, or others.

One or more embodiments thus address how to keep sensitive data in a section of a document from having too many people being able to access it and later send it to the public or a large group of people. One or more embodiments allow a large group to access a section of a document but carefully break down the document into many different sections and then carefully audit which section is being accessed by a particular user. This is advantageous for compliance checking. Suppose that "Section 3" of a document has certain information. One or more embodiments allow a determination to be made as to how many people accessed "Section 3" so as to get a sense of the risk of the information in "Section 3" being leaked.

FIGS. 5 and 6 thus illustrate how to break down a document into various sections and wrap it around with code that can be used to audit the user access to the different sections; compliance reporting and risk analysis can then be carried out to determine what was accessed and whether it was sensitive.

Thus, one or more embodiments conduct document hierarchical analysis and instrumentation of each hierarchical component to look for data access and to log same in a compliance report.

Furthermore, it will be appreciated that one or more embodiments provide a system for managing access to information in one or more documents. The system includes one or more computer systems 10 having one or more CPUs 16, one or more memories 28, and one or more network connections 20; one or more documents 402 stored in one or more of the memories; a parser 599 that parses (analyzes) one or more documents into one or more sections (this parsing can be done syntactically, e.g. by sentence/paragraph; knowledge or natural language based; model based; or even manually in which case the parser would be external and there would simply be a component (e.g., 597) that stores the (in this case, manually) parsed. Also provided is a monitor/tracker 591, 593 that tracks and logs the path of one or more users traversing though one or more of the documents to attempt to access one or more of the sections.

In some cases, one or more of the sections has a security level.

In some instances, the system further includes a gatekeeper that compares the security level of one or more of the sections to a permission level of one or more of the users attempting access to the respective section (e.g., elements 410, 424 can be combined with the system of FIGS. 5 and 6). The gatekeeper could, for example, prevent the user from accessing the respective section if the permission level of the user does not authorize access of the security level of the respective section. The attempted and prevented access to one or more of the sections could, in some instances, be logged in a record.

User access could involve, for example, a process including determining which sections have a security level meeting a criteria; and storing the sections with a security level meeting the criteria in a security repository in one or more of the memories. Such criteria could be defined, for example, by one or more of the following: a law, a regulation, and the like. In some cases, only users that meet the criteria are granted access to the repository.

The aforementioned parser may, for example, tag one or more of the sections with a tag, such as data, metadata, security information, executable code, and the like.

Cloud Service for Enterprise-Level Sensitive Data Protection with Variable Data Granularity Sensitive data protection is a significant issue for IT service providers since such providers are typically liable for any data breach. The Ponemon Institute has estimated a cost of $202 per compromised record for a data breach, with an average total cost per data breach of $6.6 million. Currently, data protection is enforced by access control at the file level (for unstructured data files), or at the data table level (for structured data bases). Unless part of the contract, sensitive data usually is mixed with other data without any special protection. A quarantined environment solution is typically too expensive and not feasible for enterprise-level data protection.

Furthermore, current techniques typically provide no fine-grained protection within files or data tables. It is possible to remove sensitive data before sharing; however, this leads to data duplication and becomes hard to manage. For databases, finer grained access control is achieved by storing data into multiple data tables with different privileges, which loses flexibility; e.g. only access one column in a table. However, access control becomes insufficient if data leaves the controlled premises, e.g., is being sent via e-mail.

Figure 9:
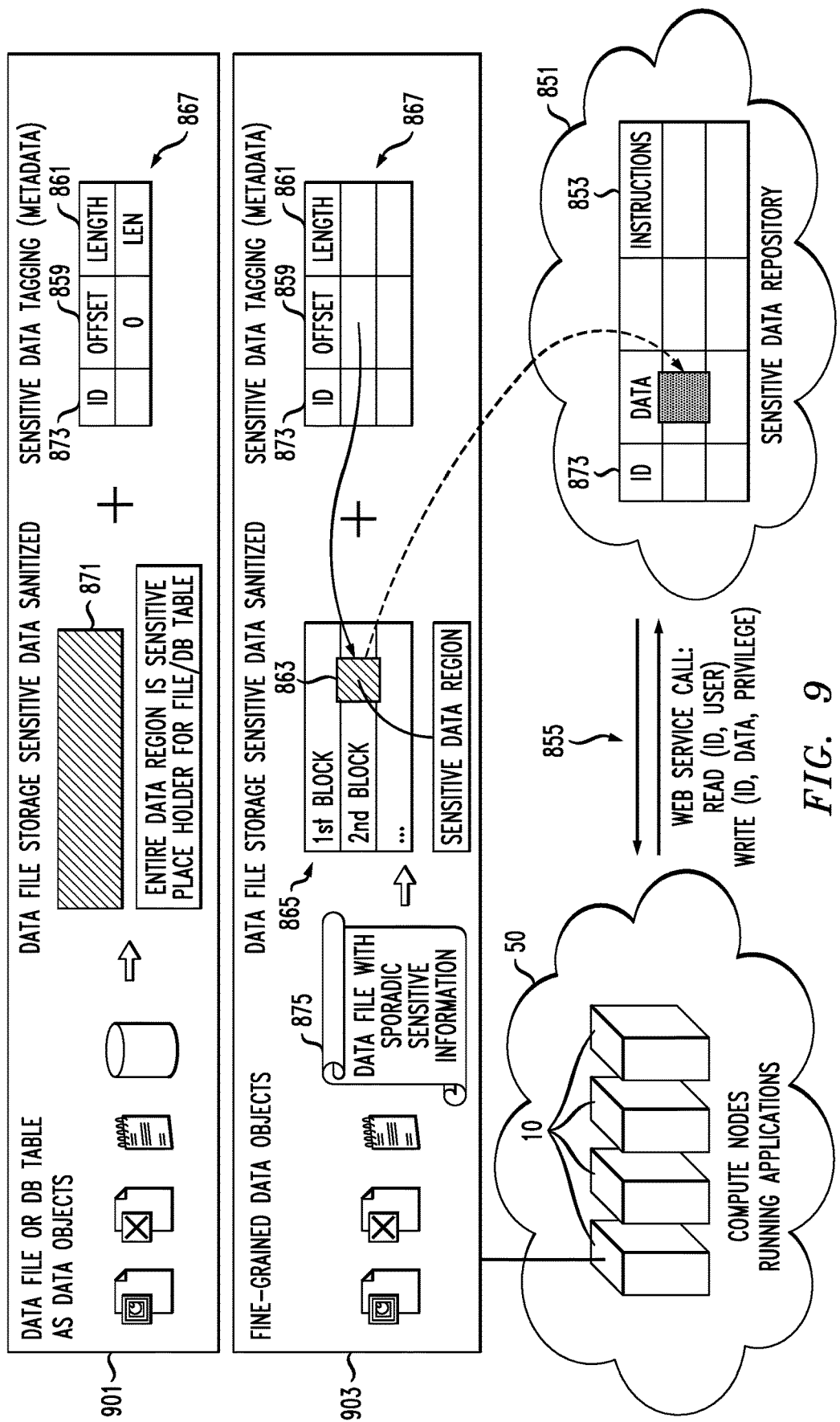
FIG. 9 shows exemplary technical details for sensitive data store and retrieval in accordance with an aspect of the invention.

Referring generally now to FIGS. 8 and 9, one or more embodiments advantageously provide a method and apparatus for enterprise-scale sensitive data management as a cloud service. Included in one or more embodiments are one or more data repositories 851 for sensitive data storage, with associated access privileges 853; standardized guest images 857 with application-transparent sensitive data diagnosis and communication with the sensitive data repository/repositories; and web service calls 855 between the data repository/repositories and guest images for data retrieval and update.

Referring initially to FIG. 8, a plurality of compute nodes 10 in a cloud 50 run a plurality of application. The cloud nodes 10 include guest virtual machine (VM) images 857 with data protection support. Data objects can include, for example, unstructured data files or database (DB) fields, as seen at 869. Sensitive data in these objects is identified and the sensitive data access privilege is edited. The compute nodes communicate with the sensitive data repository 851 via secure web service calls 855. With regard to the notation "stores reference of sensitive data on local storage," in one or more embodiments, the sensitive data per se is not stored on the local storage but rather some information (e.g., an offset) is provided in the local storage which allows the sensitive data to be located in the sensitive data repository.

Additional details, not intended to be limiting, are presented in FIG. 9. Block 901 shows exemplary handling of data files or database tables as data objects. In these instances, as shown at 871, an entire data region 871 is sensitive and all that is stored in the local storage is a placeholder for the file or database table. The entire sensitive data region is moved to sensitive data repository 851, and an identifier 873 is stored the non-sensitive data repository in connection with an offset 859 and length 861. Block 903 shows exemplary handling of fine-grained data objects, such as a data file 875 with sporadic sensitive information. Here, the data file 875 includes a plurality of data blocks; the second of these has a sensitive data region 863. The non-sensitive portions of file 875 remain in the non-sensitive data repository, and an identifier 873 is stored the non-sensitive data repository in connection with an offset 859 and length 861. Only the sensitive data region 863 is moved to sensitive data repository 851.

Records in sensitive data repository 853 are stored against the ID 873 and include the actual sensitive data, and, for each chunk of sensitive data, the associated privilege 853.

Currently, for a particular file or data, when it is put into storage or transferred, a file goes in a specific format, e.g., Windows Office format, plain text, database, and so on. One or more embodiments specify how to handle "chunks" of data, including rendering, storage, encryption, and so on. In one or more embodiments, a data chunk is divided into an offset 859 and a length 861; in other words, in a contiguous data chunk, tag a specific (e.g., sensitive) area 863 out and cause it to be removed and stored in another place (e.g., sensitive data repository 851); or, cause it to be annotated with specific rendering instructions. This data (tag data) is stored separately from the files. In this way, one file 865 will become a file and data tagging (metadata). When the file is consumed, e.g., rendered, read by another application, or the like, the application will go to the metadata 867 to determine how the chunk 863 should be displayed, handled, and/or decrypted; whether authentication is needed to verify whether a particular person is eligible to access that data chunk, and so on.

While the example in FIGS. 8 and 9 is directed primarily to protecting sensitive data, techniques illustrated therein are generally applicable to any data chunk that requires special handling instructions (display, encryption/decryption, etc.).

One or more embodiments thus provide a method for sensitive data management wherein components are structured as cloud services; sensitive data are sanitized and extracted from local storage, but real data are stored in one or more controlled data repositories; sensitive data operations such as sanitization and storage are supported at the guest images level; and communication between application nodes and data repository/repositories is handled by guest images and is application transparent.

One or more embodiments also provide a cloud service for enterprise-scale sensitive data management which includes one or more data repositories for sensitive data storage, and having associated access privileges; standardized guest images with application-transparent sensitive data operation and communication with the data repository/ repositories; and secure web service calls between the data repository/repositories and guest images for data retrieval and update.

One or more embodiments still further provide a method and apparatus for sensitive data management with variable granularities where data objects include both structured and unstructured data; and wherein data objects include an entire data file or a portion of a data file.

One or more embodiments of the cloud service for enterprise-level sensitive data protection with variable data granularity thus actually protect the sensitive data; whereas some embodiments of the effective data disclosure control with hierarchical summarization, topical structuring, and traversal audit permit data access but log same in a compliance report.

Recapitulation

Given the discussion thus far, it will be appreciated that, in general terms, an exemplary method, according to an aspect of the invention, includes the step of obtaining access to a plurality of intermediately transformed electronic documents 673 which have been transformed, by topical analysis and text summarization techniques, from a plurality of original electronic documents 402 including at least some unstructured electronic documents. The plurality of intermediately transformed electronic documents have a plurality of sections and subsections. In this regard, the original electronic documents from which the plurality of intermediately transformed electronic documents are obtained do not necessarily have formal section and subsection headings but rather any kind of text may be present in the original electronic documents. However, when such text is characterized or broken down (i.e. parsed or decomposed) to obtain the plurality of intermediately transformed electronic documents, logical sections and subsections result from the parsing or decomposition process.

Also included is appending (see, e.g., step 667) to the sections and subsections audit and retrieval agent code to create a plurality of finally transformed electronic documents 597.

Further steps (see, e.g., 406) include allowing users to access the finally transformed electronic documents; providing the users with accountability reminders (see, e.g., 597) contemporaneous with the access; logging the access of the users to the sections and subsections of the finally transformed electronic documents (using the appended audit and retrieval agent code; see, e.g., 593, 595, 591, 665); and providing an audit report based on the logging of the access of the users (see, e.g., 593, 591, 665). Detailed section and subsection accesses are preferably logged to audit database 665 by the traversal audit agent 593.

In some cases, the obtaining step (see, e.g., 599, 675) includes using the topical analysis 679 and text summarization techniques 677 to create the plurality of intermediately transformed electronic documents from the plurality of original electronic documents 673 including the at least some unstructured electronic documents. The plurality of intermediately transformed electronic documents have section headers and summaries and are rendered in extensible markup language.

In some cases, the original electronic documents 402 further include the at least some structured electronic documents and some semi-structured electronic documents; in some cases, the obtaining step can further include using the topical analysis and text summarization techniques on the structured electronic documents and the semi-structured electronic documents (topical analysis and text summarization techniques are only used on structured and/or semi-structured documents in some cases).

In one or more embodiments, the appending step 667 further includes wrapping the extensible markup language with the audit and retrieval agent code and accountability reminder code, based on input from a risk profile database 669. Risk profile database 669 includes data records describing what data can be accessed by whom. Wrapping can also be referred to as transforming, combining, or attaching.

In some instances, an additional step includes updating the risk profile database 669 and the accountability reminder code based on an analysis of the audit report. For example, suppose historical access data shows that a set of people from Department A of a firm have been accessing data from Department B, which they would not normally be expected to need access to. Appropriate action could be taken in response.

In one or more embodiments, data is accessed using data viewer 412; audit tracking code is added using tracker generator 671 (part of 599); users are allowed to access the documents using the information retrieval agent 408; users are provided with accountability reminders using the data viewer 412; and access is logged using traversal audit agent 593 placing the audit data into analyzer 591. Traversal audit agent 593 is the auditing code added by the tracker generator 671.

In another aspect, another exemplary method includes, in a cloud computing system 50 including a plurality of interconnected compute nodes 10 running a plurality of applications operating on a plurality of data objects 869 stored in a normal storage area, instantiating at least one guest virtual machine image 857. Another step includes removing, with the at least one guest virtual machine image, select regions 863, 871 of the data objects. The select regions require special handling. Further steps include storing, in connection with the plurality of data objects in the normal storage area, an index (by way of example and not limitation, offset 859 and length 861) of a corresponding one of the removed select regions; writing (see, e.g., write portion of web service calls 855) the removed select regions of the data objects into a separate customized (e.g., sensitive) data repository 851 together with corresponding attributes 853 specifying the special handling; and, for a given one of the data objects having at least one of the select regions requiring the special handling, providing the special handling when consuming the given one of the data objects in accordance with an appropriate one of the corresponding attributes (e.g., read portion of web service calls 855). The steps described can be carried out by the guest virtual machine image(s) executing on one or more hardware processors and interacting as appropriate with the normal storage and sensitive data repository.

A variety of different kinds of special handling can be provided. For example, in some cases, the guest virtual machine images 857 vide data protection support; the select regions 863, 871 include sensitive data; the special handling includes access control for the sensitive data (e.g., read web service call is allowed only if privilege 853 indicates appropriate); the corresponding attributes include access privileges 853; and the providing of the special handling includes allowing consumption of the given one of the data objects if allowed by a corresponding one of the access privileges (e.g., read web service call is allowed only if privilege 853 indicates appropriate).

However, instead of sensitive data handling, regions 863 or 871 might involve, for example, special display or encryption/decryption instructions. Thus, in some cases, the select regions include data requiring encryption for storage and decryption for consumption; the special handling includes the encryption and decryption; the writing (in writing web services calls 855) the removed select regions includes writing encrypted versions of the select regions (e.g., into repository 851 with column 853 having encryption/decryption instructions'). Thus, in such cases, the corresponding attributes include encryption and decryption instructions; and the providing of the special handling includes, for the given one of the data objects having the at least one of the select regions requiring the special handling, decrypting the at least one of the select regions requiring the special handling to permit the consumption of the given one of the data objects (in reading web services calls 855).

Furthermore, in some cases, the select regions 863 or 871 include data requiring special display during consumption; the special handling includes the display; the corresponding attributes include display instructions (e.g., column 853); and the providing of the special handling includes, for the given one of the data objects having the at least one of the select regions requiring the special handling, displaying the given one of the data objects with at least the one of the select regions requiring the special handling displayed in accordance with the display instructions (e.g., display device 24 displays in accordance with instructions in reading web services calls 855). In some instances, display instructions are passed back in the read web services call 855.

FIG. 9 thus depicts combination of specialized and original data.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a di splay and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a tracker generator module, an analyzer module, and a data viewer module, the data viewer module having an information retrieval agent and a traversal audit agent. In another aspect, the module(s) include guest virtual machine image(s) executable on one or more hardware processors and configured to interact as appropriate with the normal storage and sensitive data repository. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising: in a cloud computing system comprising a plurality of interconnected compute nodes running a plurality of applications operating on a plurality of data objects stored in a normal storage area, instantiating at least one guest virtual machine image; removing, with said at least one guest virtual machine image, select regions of said data objects, said select regions requiring special handling; storing, an identifier for each of said select regions in said normal storage area; writing said removed select regions of said data objects into a separate customized data repository, with said identifiers, wherein each of said identifiers is associated with respective tag data comprising corresponding attributes specifying said special handling of a corresponding one of said removed select regions; and for a given one of said data objects associated, by said identifiers, with at least one of said select regions requiring said special handling, providing said corresponding attributes specifying said special handling for said at least one of said select regions to at least one of said applications consuming said given one of said data objects, wherein provided ones of said corresponding attributes correspond to said removed select regions of said given one of said data objects in accordance with said identifiers, wherein said corresponding attributes specifying said special handling of said corresponding one of said removed select regions comprises agent code executed by said application generating an interactive hierarchical access log upon access to said corresponding one of said removed select regions.

2. The method of claim 1, wherein, in said storing step, each of said identifiers is associated with an offset and a length locating a respective one of said select regions in said separate customized data repository.

3. The method of claim 2, wherein:
said at least one guest virtual machine image provides data protection support;
said select regions comprise sensitive data;
said special handling comprises access control for said sensitive data;
said corresponding attributes comprise access privileges; and
said at least one of said applications enforces said special handling, according to said corresponding attributes provided, allowing consumption of said select regions of said given one of said data objects according to a corresponding one of said access privileges.

4. The method of claim 2, wherein:
said select regions comprise data requiring encryption for storage and decryption for consumption;
said special handling comprises said encryption and decryption;
said writing said removed select regions comprises writing encrypted versions of said select regions;
said corresponding attributes comprise encryption and decryption instructions; and
said providing of said special handling comprises, for said given one of said data objects having said at least one of said select regions requiring said special handling, decrypting said at least one of said select regions requiring said special handling to permit said consumption of said given one of said data objects.

5. The method of claim 2, wherein:
said select regions comprise data requiring special display during consumption;
said special handling comprises said display;
said corresponding attributes comprise display instructions; and
said providing of said special handling comprises, for said given one of said data objects having said at least one of said select regions requiring said special handling, displaying said given one of said data objects with at least said one of said select regions requiring said special handling displayed in accordance with said display instructions.

6. The method of claim 1, further comprising providing a system, wherein the system comprises at least one distinct software module embodied on a computer-readable storage medium, and wherein the distinct software module comprises said at least one guest virtual machine image.

7. A computer program product comprising a non-transitory computer readable storage medium having computer readable program code embodied therewith, said computer readable program code comprising: computer readable program code configured to, in a cloud computing system comprising a plurality of interconnected compute nodes running a plurality of applications operating on a plurality of data objects stored in a normal storage area, instantiate at least one guest virtual machine image; computer readable program code configured to remove, with said at least one guest virtual machine image, select regions of said data objects, said select regions requiring special handling; computer readable program code configured to store, an identifier for each of said select regions in said normal storage area; computer readable program code configured to write said removed select regions of said data objects into a separate customized data repository, with said identifiers, wherein each of said identifiers is associated with respective tag data comprising corresponding attributes specifying said special handling of a corresponding one of said removed select regions; and computer readable program code configured to, for a given one of said data objects associated, by said identifiers, with at least one of said select regions requiring said special handling, providing said corresponding attributes specifying said special handling for said at least one of said select regions to at least one of said applications consuming said given one of said data objects, wherein provided ones of said corresponding attributes correspond to said removed select regions of said given one of said data objects in accordance with said identifiers, wherein said corresponding attributes specifying said special handling of said corresponding one of said removed select regions comprises agent code executed by said application generating an interactive hierarchical access log upon access to said corresponding one of said removed select regions.

8. The computer program product of claim 7, wherein, in said computer readable program code configured to store said identifiers for each of said select regions, each of said identifiers is associated with an offset and a length locating a respective one of said select regions in said separate customized data repository.

9. The computer program product of claim 8, wherein:
said at least one guest virtual machine image provides data protection support;
said select regions comprise sensitive data;
said special handling comprises access control for said sensitive data;
said corresponding attributes comprise access privileges; and
said at least one of said applications enforcing said special handling, according to said corresponding attributes provided, allowing consumption of said select regions of said given one of said data objects according to a corresponding one of said access privileges.

10. The computer program product of claim 8, wherein:
said select regions comprise data requiring encryption for storage and decryption for consumption;
said special handling comprises said encryption and decryption;
said writing said removed select regions comprises writing encrypted versions of said select regions;
said corresponding attributes comprise encryption and decryption instructions; and
said computer readable program code configured to provide said special handling comprises, for said given one of said data objects having said at least one of said select regions requiring said special handling, computer readable program code configured to decrypt said at least one of said select regions requiring said special handling to permit said consumption of said given one of said data objects.

11. The computer program product of claim 8, wherein:
said select regions comprise data requiring special display during consumption;
said special handling comprises said display;
said corresponding attributes comprise display instructions; and
said computer readable program code configured to provide said special handling comprises, for said given one of said data objects having said at least one of said select regions requiring said special handling, computer readable program code configured to display said given one of said data objects with at least said one of said select regions requiring said special handling displayed in accordance with said display instructions.

* * * * *